United States Patent [19]

Harley

[11] Patent Number: 5,570,650
[45] Date of Patent: Nov. 5, 1996

[54] SURFACE EFFECT VESSEL HULL

[76] Inventor: Howard D. Harley, 685 E. Pearl St., Bartow, Fla. 33830

[21] Appl. No.: 620,117

[22] Filed: Mar. 21, 1996

[51] Int. Cl.$^6$ .................................................. B63B 1/00
[52] U.S. Cl. ........................... 114/61; 114/289; 114/290; 114/292; 114/67 R
[58] Field of Search ........................... 114/61, 123, 67 R, 114/67 A, 271, 288, 289, 290, 292

[56] References Cited

U.S. PATENT DOCUMENTS

| 3,191,572 | 8/1963 | Wilson | 115/16 |
|---|---|---|---|
| 3,382,833 | 6/1966 | Wukowitz | 114/66.5 |
| 3,606,857 | 9/1971 | Sundquist | 115/11 |
| 4,031,841 | 6/1977 | Bredet | 114/67 |
| 4,228,752 | 10/1980 | Sladek et al. | 114/67 |
| 4,523,536 | 6/1985 | Smoot | 114/67 |
| 4,574,724 | 3/1986 | Stolper | 114/67 |
| 4,587,918 | 5/1986 | Burg | 114/67 |
| 5,002,004 | 3/1991 | Kunitake et al. | 114/61 |
| 5,176,095 | 1/1993 | Burg | 114/67 |
| 5,415,120 | 5/1995 | Burg | 114/67 |

FOREIGN PATENT DOCUMENTS 8910294  11/1989  WIPO .................................. 114/290

OTHER PUBLICATIONS

Pamphlet titled: The New "Dual-Air" CAT/SES, by Air Ride Craft, Inc.—No date given—1993–1995.

*Primary Examiner*—Stephen Avila
*Attorney, Agent, or Firm*—David W. Pettis, Jr., P.A.

[57] ABSTRACT

A surface effect hull particularly suitable for use with a catamaran vessel. The twin hulls each comprise a V-shaped portion and a recess portion that receives pressurized gas therein. The V-shaped bow portion create dynamic lift and the pressurized air portion creates an air cushion for reduction of drag.

6 Claims, 4 Drawing Sheets

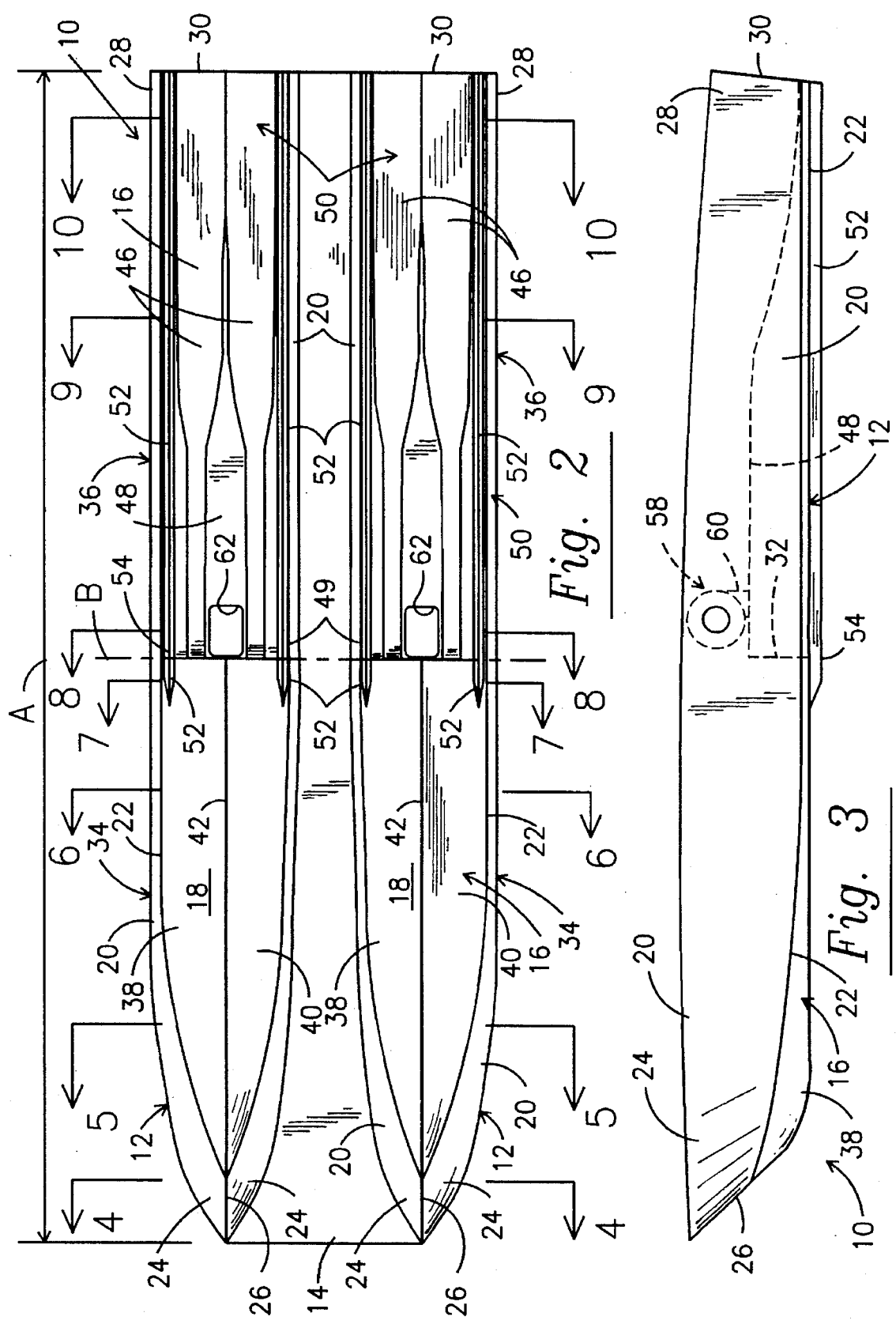

5,570,650

SURFACE EFFECT VESSEL HULL

BACKGROUND OF THE INVENTION

1. Field of the Invention

The present invention relates to marine vessel hulls utilizing pressurized gas cushions maintained in a recess in a portion of the bottom of the hull for reduction of water drag on the hull, thereby increasing the speed and fuel efficiency of the vessel. This invention more particularly relates to a marine vessel having a catamaran configuration with each catamaran side hull having a pressurized gas cushion.

2. Description of the Prior Art

One of the primary objectives in boat design is to reduce the amount of drag caused by the interface of the hull with the water surface. Early planing hulls were designed so that forward motion of the hull raised the vessel to cause it to ride on a smaller portion of its hull surface resulting in reduced hull-to-water friction. The design of hydrofoil vessels further reduced hull contact with the water by attaching foils to the hulls upon which the boats ride at high speed. Some marine vessels interpose a film of air between the vessel's hull and the water to reduce the hull-to-water friction. One example is illustrated in U.S. Pat. No. 3,191,572 issued to H. A. Wilson in which a tri-hulled vessel has air introduced along the bottom of each hull. This air is allowed to stream freely from the stern of the vessel. U.S. Pat. No. 4,031,841 issued to Bredt also discloses the technology for an air film hull. The Bredt and Wilson hulls still ride with the hull relatively low in the water so that much of the sides of the hulls maintain contact with the water, but the drag between a portion of the bottom is somewhat reduced by a film of air mixed with water.

Surface effect ships were an improvement over the air film hulls as the hulls of surface effect ships are raised out of the water by a pressurized air cushion that is partially captured within the hull of the vessel. The prior art of air cushion vessel hull designs have contained the air cushion with flexible seals, which are a rubberized curtain, either all around the vessel as in the case of the hovercraft air cushioned vessels, or across the front and the back of the vessel with thin parallel side hulls that provide a side seal for the air cushion as in the case of surface effect ships. The flexible seals reduce the amount of air lost from the air cushion but create a rough ride, "a cobble stone ride," even in smooth water. As the surface of the water becomes rougher the flexible seals can be separated from each other, causing further deterioration in ride quality. Also, in rough water the flexible seals frequently fail to maintain the air cushion, causing the craft's hull to drop lower into the water until the seal is regained and the air cushion is reestablished. The loss of the air cushion increases the hull contact with the water increasing the hull-to-water friction and significantly slowing the vessel. Seals are a high maintenance problem with frequent breakage that results in permanent loss of air cushion and a slow ride to the repair yard. Such surface effect ships are disclosed by U.S. Pat. Nos. 5,415,120, and 4,392,445 issued to Donald E. Burg and U.S. Pat. No. 4,523,536 issued to Mark H. Smoot.

Notwithstanding the existence of such prior art for surface effect ships, it remains clear that there is a need for a vessel which will maintain a relatively smooth ride and maintain the air cushion whether the water is smooth or rough without the use of flexible seals. Also, there is a need to improve the stability of surface effect ships which are notoriously unstable in rough water.

SUMMARY OF THE INVENTION

The present invention relates to a surface effect ship having a pair of V-shaped hulls having air cushion recesses that receive pressurized air to provide an efficient, stable, smooth, high speed ride. The surface effect vessel hull comprises two catamaran hulls joined by a deck surface, each catamaran hull defining a longitudinal dimension. Each catamaran hull comprises a bottom, having an exterior surface; and opposing sides, having first and second ends, attached to the bottom and extending upwardly therefrom, the sides curving inwardly and joining together at the first end to form a bow and being connected together at the second end by a transversely extending transom. A step, a generally planar surface, extends inwardly from the bottom generally perpendicular to the longitudinal dimension so that a plane defined by the step separates each catamaran hull into two parts, a bow portion extending forward of the plane and an air cushion portion extending rearwardly of the plane.

The bow portion of the bottom comprises a first face and a second face that are joined together to form a v-shape that extends from proximal the bow to the step. The apex of the v-shape defines the keel of the bow portion. The first and second face each define an angle with a horizontal plane which is defined as the dead rise angle of the hull. A cross section of the hull generally perpendicular to the longitudinal dimension defines a dead rise angle that lies within a range of 45°–65°. The dead rise angle decreases to less than 25° as defined by the intersection between the step and the bottom of the bow portion.

The air cushion portion of the bottom has a recess formed therein, the recess extending inwardly from the exterior surface of the bottom incorporating the step as one side of the recess and the recess extending rearward from the step to the transom. The recess defines secondary catamaran hull sections that extend from the step to a point adjacent the transom. A pressurized air generation means, that is well known in the art, is connected in fluid flow communication with the air cushion recess.

The invention accordingly comprises an article of manufacture possessing the features, properties, and the relation of elements which will be exemplified in the article hereinafter described, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which:

FIG. 2 is a bottom plan view of the invention of FIG. 1.

FIG. 3 is right side elevation of the surface effects hull.

Similar reference characters refer to similar parts throughout the several views of the drawings.

DETAILED DESCRIPTION

Figure 1:
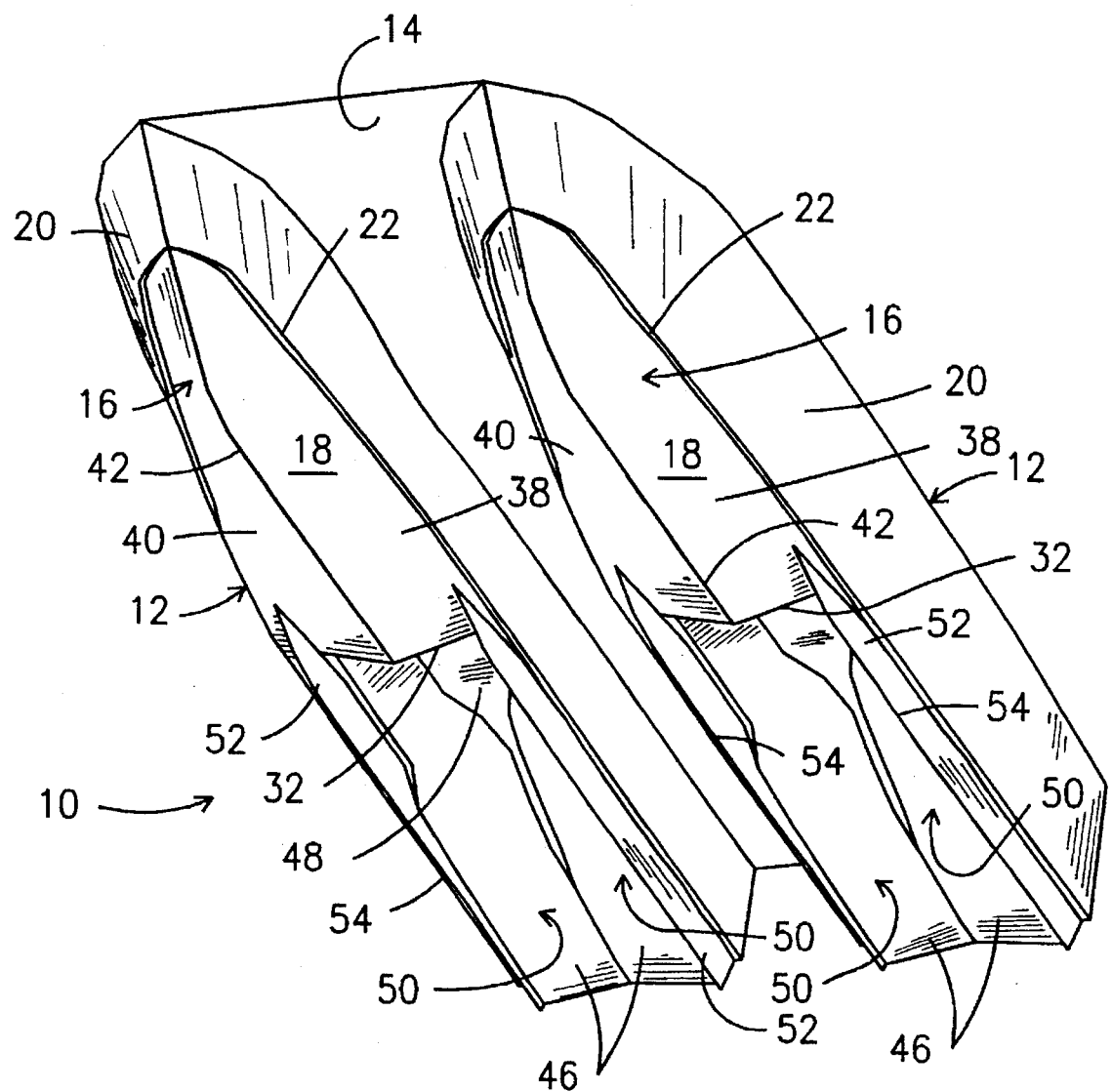
FIG. 1 is a perspective view of the surface effect vessel hull of this invention.
Figure 4:
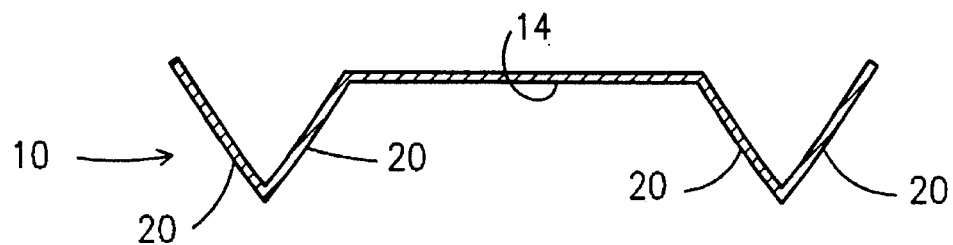
FIG. 4 is a sectional elevation view taken along line 4—4 of FIG. 2.

A preferred embodiment for the surface effect vessel hull is illustrated in the drawing FIGS. 1–10 in which the surface effect vessel is generally indicated as 10. Referring first to FIG. 1 it can be seen that the vessel hull 10 comprises a pair of catamaran hulls 12 that are joined to one another by a deck 14.

Figure 5:
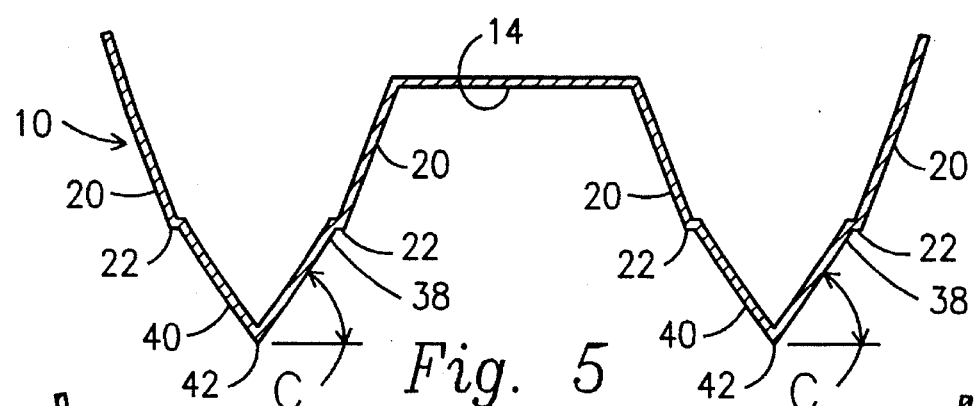
FIG. 5 is a sectional elevation view taken along line 5—5 of FIG. 2.
Figure 6:
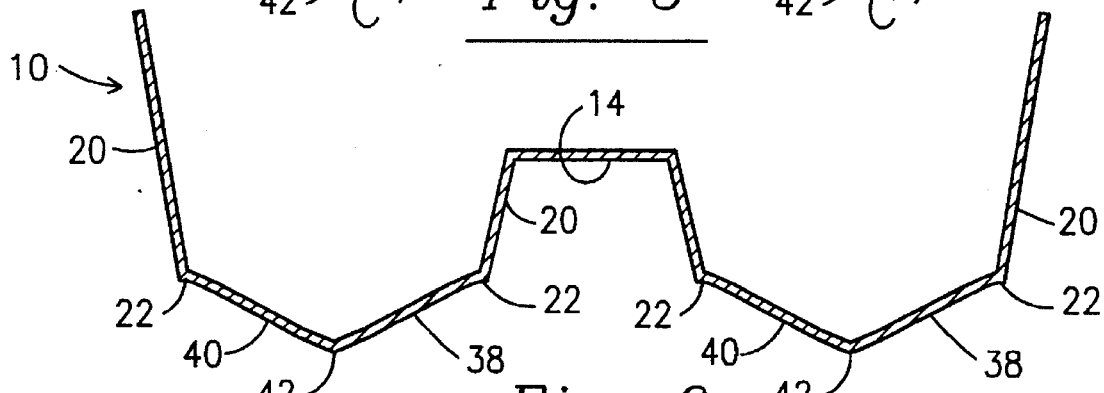
FIG. 6 is a sectional elevation view taken along line 6—6 of FIG. 2.
Figure 7:
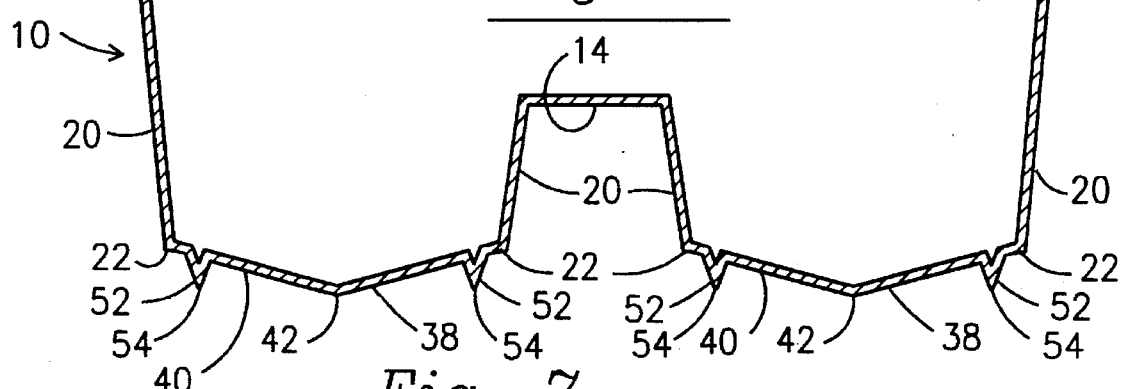
FIG. 7 is a sectional elevation view taken along line 7—7 of FIG. 2.
Figure 8:
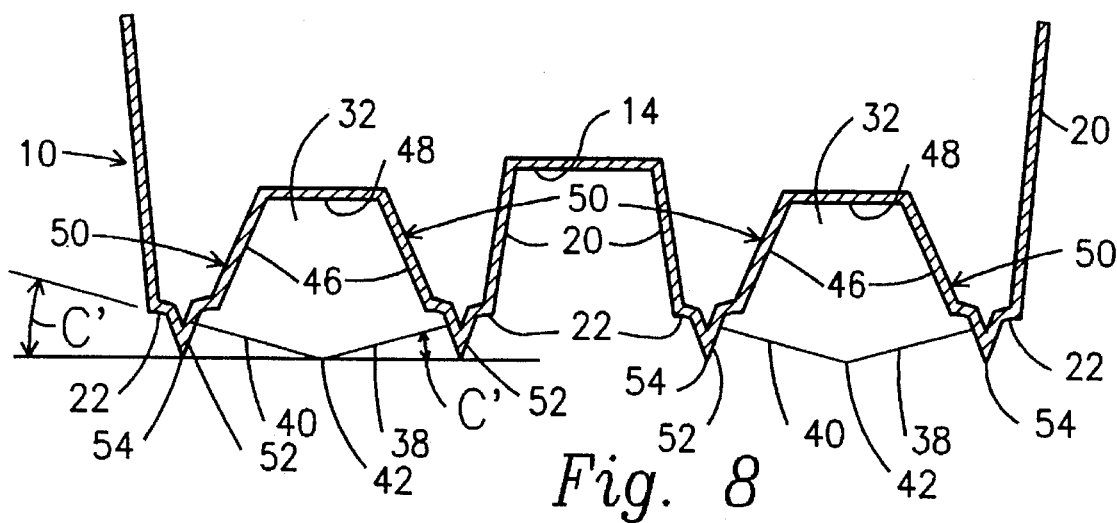
FIG. 8 is a sectional elevation view taken along line 8—8 of FIG. 2.

As shown in FIG. 2, each catamaran hull has a longitudinal dimension A, and comprises a bottom 16, that has an exterior surface 18, a pair of opposing sides 20 that are attached to the bottom 16 and extend upwardly therefrom. For the purposes of this specification, the chine 22 defines the line of attachment of the sides 20 to the bottom 16. The first ends 24 of each side 20 are joined to form the bow 26, and the second ends 28 are connected to one another by a transom 30 that extends transversely therebetween. A step 32, which can be seen most clearly in FIGS. 3 and 8, extends inwardly from the bottom 12, generally perpendicular to the longitudinal dimension A. As seen in FIG. 2, the step 32 lies in a plane B that defines a bow portion 34 extending forwardly, including the bow 26, and an air cushion portion 36 extending rearwardly of said plane and including the transom 30. In a preferred embodiment, the bow portion 34 comprises 50 percent of the overall length of the vessel from bow 24 to the transom 30, that is the step 32 is generally at the mid point between the bow 26 and the transom 32. In other embodiments, the step 32 may be located between 42 percent and 80 percent of the longitudinal length of the vessel 10 as measured from the bow 26 and still provide a vessel with acceptable characteristics. The bow portion 34 of the bottom 16 comprises a first face 38 and a second face 40 that are joined along the keel 42 to form a V-shape. Each face, 38 and 40, forms an angle C with a horizontal plane, angle C is defined as the dead rise of the hull. At a cross section of the bottom 16 proximal the bow 26, as shown in FIG. 5, the angle C is preferably 55 degrees, however in other embodiments the angle C proximal the bow 26 may lie within the range of 30 degrees to 65 degrees and still function satisfactorily. In a preferred embodiment, the angle C gradually decreases to 16–20 degrees at the transom 30, angle C' as shown in FIG. 8. In other embodiments, the angle C' may lie within the range of 25 degrees to 0 degrees and still function satisfactorily.

Figure 9:
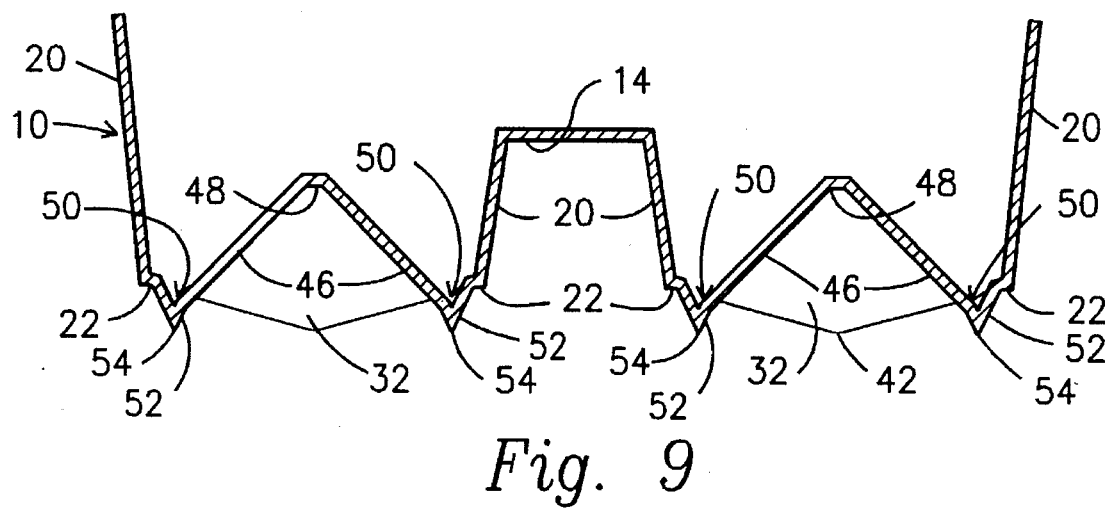
FIG. 9 is a sectional elevation view taken along line 9—9 of FIG. 2.
Figure 10:
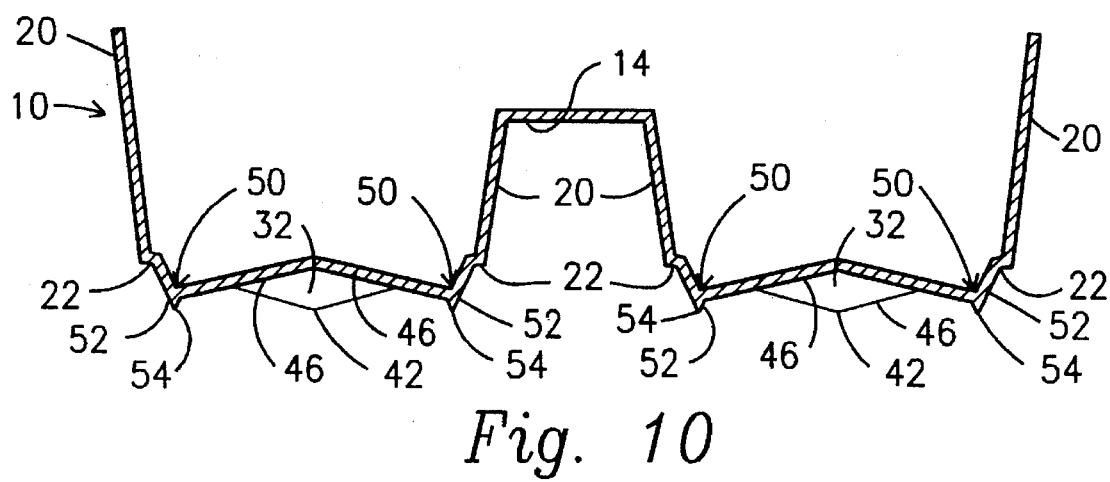
FIG. 10 is a sectional elevation view taken along line 10—10 of FIG. 2.

The air cushion portion 36 of the bottom 16 has an air cushion recess 44 formed therein that extends inwardly from the exterior surface 18 of the bottom 16, and extends rearwardly to proximal the transom 30. The recess 44 is bounded by the step 32 at the forward end, sloping recess sides 46 that extend rearward to the transom 30 and a downwardly curving top 48, which in the embodiment disclosed, tapers to nothing as shown in FIGS. 9 and 10. In other embodiments the air cushion recess 44 may comprise many different shapes that are well known in the art, the shape shown is but one example of a shape that works effectively. The recess sides 46 and the sides 20 of the catamaran hull 12 form a pair of secondary catamaran hull sections 50 that extend from the step 32 to the transom 30. Each secondary catamaran hull section 50 has a fin 52 formed thereon that extends generally the length of the secondary catamaran hull section 46. In a preferred embodiment, the length of the recess 44 (the longitudinal length of the recess sides 46) is greater than the transverse width (the athwartship dimension) of the recess 44 as measured between the fins 52 at right angles to the longitudinal dimension A.

In a preferred embodiment, the fins 52 extend from proximal the transom to a point forward of the step 32, onto the bottom surface 18 of the bow portion 34, the point forward of the step being at a distance frown the step that lies within the range of 2.9 percent to 7.1 percent of the overall longitudinal dimension of the vessel 10. In a preferred embodiment the fins 52 extend 5 percent of the overall longitudinal dimension of the vessel 10, for example, on a 100 foot vessel the fins 52 will extend five (5) feet beyond the step 32. Extension of the fins 52 beyond five (5) percent causes the ride of the vessel to degrade without gaining any increased protection of the air cushion recess 44. The vertical dimension of the fin 52, measured generally normal to the hull, preferably extends one half to 1 percent, of the overall longitudinal dimension of the vessel hull 10, from the bottom surface 18, e.g. approximately 9 to 12 inches for a vessel 10 having a 100 foot longitudinal dimension.

The portion of each fin 52 that is distal the boat 10 comprises a fin keel portion 54. The fin keel portions 54 of each fin 52 lie generally in the same plane with one another and generally in the same plane as a portion of the keel 42 of the bow portion 34 of the hull 10 that is proximal to the step 32.

A pressurized air generation means, shown generally as 58 is preferably mounted within the vessel 10 and is connected by duct 60 to outlets 62 formed in the top 48 of the recess 44. Devices 58 for supplying air under pressure are well known in the art and may be provided as individual units as shown in FIG. 3, or a single unit may be used that is connected to each outlet 62 by extended ducts 60. The devices may be operated from their own motors or may be operated by a power take-offs from inboard motors.

The surface effect hull 10 may be constructed of fiber glass, synthetic resins, composites, aluminum, steel, or any other material that is suitable for the purpose. Boats or ships constructed using the surface effect hull design disclosed may use any drive method including standard outboard motors for smaller boats and larger inboard gas or diesel engines or turbine engines for large vessels. The amount of power required to operate such a vessel will be far less than that required by a conventional boat or ship.

Having thus set forth a preferred construction for the surface effect hull 10 of this invention, it is to be remembered that this is but a preferred embodiment. Attention is not invited to a description of the use of surface effect hull 10. Certainly many different super structures may be constructed on the hull 10 depending on the use for which the vessel is intended, including but not limited to racing craft, pleasure yachts, and for freight and/or passenger transport.

The surface effect hull 10 discussed below is discussed in relation to a hull 10 that has a longitudinal dimension of 100 feet. Various size hulls 10 may be constructed with generally proportional dimensions, however, these dimensions may be adjusted by those skilled in the art depending upon the specific use that is intended for the vessel utilizing the surface effect hull 10. The surface effect hull 10 does not incorporate any flexible seals, eliminating the problems associated therewith, a rough ride, high maintenance, control problems, high hump drag (meaning ships with flexible seals are hard to get up on the cushion, to get over the hump, which takes a lot of power that is not necessary when the vessel is on the cushion). The surface effects hull 10 is a catamaran with twin hulls that each have a pressurized air cushion over approximately 50 percent of its length. Each hull 12 has a bow portion 34 that comprises the remaining 50 percent of the longitudinal dimension. The bow portion 34 of each catamaran hull 12 has a V-bottom 16 with a sharp entry proximal the bow 26, a dead rise of approximately 55 degrees, the dead rise is reduced to less than 25 degrees proximal the step 32, easily creating dynamic lift as the vessel's speed increases so that the vessel easily begins to plane, as boats without air cushions have operated for years. The sharp entry bow portion 34 is designed to deflect the approaching waves both downward and sideways in a progressive manner over a substantial part of the craft's length. The water passing beneath the air cushions is consequently modified to be essentially horizontal, even when the surface effect ship 10 is operating in significant seas. The advantages of this design, which modifies the flow of the approaching waves before they reach the air cushion portions 36 of the hull 12 are considerable. Flexible seals used by conventional surface effect ships are unnecessary, eliminating the high maintenance costs and down time required for repair of flexible seals. Without the modification of the waves to essentially a horizontal configuration, the waves strike the flexible seals of conventional surface effect ships causing reduction in cushion volume and variations in the cushion pressure creating additional lift power requirements, and along with bow slamming are the primary factors that can result in a rough ride. The sharp entry of the bow portion 34 of the two catamaran hulls 12 greatly reduces pitching, green water and spray compared with the conventional surface effect ship.

However, once on plane there remains a large portion of the vessel bottom 12 that would remain wetted, in contact with the water, creating drag. By placement of a pressurized air cushion under this portion of the hull, the drag is greatly reduced as the air cushion portion 36 of the surface effect hull 10 rides on air. Therefor the surface effect hull 10 combines dynamic lift with lift from a pressurized air cushion, making it easy for the vessel to reach plane and yet significantly reduces the drag on the hulls 12. The bow portion 34 of the hull 12 has only a small wetted area to create drag due to the highly efficient dynamic lift created by the bow portion 34. The pressurized air cushions, which create air platform lift, cover the majority of the hull surface of the air cushion portion 36 of the hull 12 that is in direct contact with the water reducing drag. This combination gains from the best of dynamic lift and air platform lift to create a highly efficient hull design not previously obtained in successful boat and ship hull design.

Use of twin hulls 12, each with a separate pressurized air cushion increases the stability without appreciably increasing the drag. The separated hulls and separated air cushions create a large roll-restoring force which produces a surface effect ship that is not very center-of-gravity sensitive. Stiffness and damping in roll are greatly increased because each air cushion acts on the cushion separation arm to provide roll stability. The bridge span between the twin hulls 12 is much smaller than the bridge span on a conventional surface effect ship of the same beam. Such wide spacing on the conventional surface effect ship creates a heavy ship as wide spacing between the hulls requires very significant structural reinforcement. Twin hulls 12 also increase the efficiency of performance at all speeds compared with the design of a single cushion surface effect ship that can only be designed for efficiency at one speed. Performance improvements also result from air cushions recesses that have a longitudinally extending dimension that is appreciably greater than the athwartship dimension.

Placement of the air cushion recess 44 too far forward reduces the dynamic lift and exposes the air cushion recess 44, which would then require the use of a flexible curtain as in the prior art conventional surface effect ships. Beginning the air cushion recess 44 too far from the bow 26 would increase the drag appreciably. A 50 percent bow portion 34 combined with a 50 percent air cushion portion 36 has been found to be a preferred embodiment for the surface effect hull 10.

The air cushion recess 44 must be protected so that water does not enter the recess 44 or an unacceptable amount of air escape forward. The sharp entry that gradually reduces to a dead rise of less than 25° deflects the approaching waves both downward and sideways and modifies the water as it approaches the air cushion recess 44 to essentially horizontal flow. The fins 52 that extend forward of the air cushion recess 44 shield the air cushion recess 44 preventing the escape of air and the entry of water into the recess 44 so that the air cushion is maintained.

It will thus be seen that the objects set forth above, among those made apparent from the preceding description, are efficiently attained and, since certain changes may be made in the above article without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all a statements of the scope of the invention which, as a matter of language, might be said to fall therebetween.

Now that the invention has been described,
What is claimed is:
1. A surface effect vessel hull comprising;
two catamaran hulls joined by a deck, each catamaran hull defining a longitudinal dimension;
each said catamaran hull comprising a bottom having an exterior surface, opposing sides attached to said bottom and extending upwardly therefrom and a transom connecting said sides and being attached to and extending upwardly from said bottom, a step extending inwardly from said bottom generally perpendicular to said longitudinal dimension, said step lying in a plane passing through said hull generally transverse to said longitudinal dimension defining a bow portion extending forward of said plane and an air cushion portion extending rearwardly of said plane;
said bow portion of each said catamaran hull bottom comprising a first face and a second face joined to form a V-shape that extends from proximal said bow to said step, a line formed by said intersecting faces defining a keel of said bow portion, said first and second faces each defining an angle with a horizontal plane passing through said keel, said angle at a cross-section proximal said bow is at least 45 degrees, said angle diminishing to less than 25 degrees at said step;
said air cushion portion of each said catamaran hull bottom having a recess formed therein, said recess extending inwardly from said exterior surface of said bottom, said recess extending rearward from said step to proximal said transom, said recess defining secondary catamaran hull sections extending from said step to said transom, pressurized air generation means connected in fluid flow relation to said air cushion recess.

2. A surface effect vessel hull as in claim 1 wherein said bow portion of each catamaran hull has a longitudinal dimension from said bow to said step that lies within the range of 35 to 80 percent of the longitudinal length of said catamaran hull from said bow to said transom.

3. A surface effect vessel hull as in claim 1, wherein said angle diminishes from at least 55 degrees proximal said bow to 20 degrees or less at said step.

4. A surface effect vessel hull as in claim 1 comprising a fin extending downwardly from each secondary catamaran hull section, said fin extending from proximal said transom to a point forward of said step, said point forward of said step being at a distance from said step that lies within the range of 2.9 percent to 7.1 percent of the overall longitudinal dimension of said vessel.

5. A surface effect vessel hull as in claim 4, wherein each said fin comprises a keel portion, said fin keel portion of each said catamaran hull section lies generally in the same plane with one another and generally in the same plane as the keel of said bow portion of said hull proximal said step.

6. A surface effect vessel hull as in claim 1 comprising catamaran hulls having longitudinal axes generally parallel to one another and said catamaran hulls being spaced apart from one another.

\* \* \* \* \*